(12) United States Patent
Cho et al.

(10) Patent No.: US 7,759,018 B2
(45) Date of Patent: Jul. 20, 2010

(54) DIRECT LIQUID FEED FUEL CELL AND PORTABLE ELECTRONIC APPARATUS INCLUDING THE SAME

(75) Inventors: Hye-Jung Cho, Anyang-si (KR); Kyoung Hwan Choi, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1226 days.

(21) Appl. No.: 11/299,724

(22) Filed: Dec. 13, 2005

(65) Prior Publication Data
US 2006/0147783 A1    Jul. 6, 2006

(30) Foreign Application Priority Data
Dec. 13, 2004    (KR) .................... 10-2004-0117963

(51) Int. Cl.
*H01M 8/10*    (2006.01)
*H01M 2/02*    (2006.01)
(52) U.S. Cl. .................. 429/513; 429/34; 429/32; 429/483; 429/490; 429/512; 429/515
(58) Field of Classification Search .............. None
See application file for complete search history.

(56) References Cited

U.S. PATENT DOCUMENTS

| | | | |
|---|---|---|---|
| 4,997,726 A * | 3/1991 | Akiyama et al. | 429/30 |
| 6,127,058 A * | 10/2000 | Pratt et al. | 429/30 |
| 6,326,097 B1 | 12/2001 | Hockaday | |
| 2003/0180594 A1 * | 9/2003 | Choi et al. | 429/32 |
| 2003/0198853 A1 * | 10/2003 | Choi et al. | 429/32 |
| 2004/0131907 A1 * | 7/2004 | Arita et al. | 429/30 |

FOREIGN PATENT DOCUMENTS

| | | |
|---|---|---|
| JP | 57-055069 | 4/1982 |
| JP | 58-035875 | 3/1983 |
| JP | 62-076258 | 4/1987 |
| JP | 2002-280016 | 9/2002 |
| JP | 2003-045453 | 2/2003 |

(Continued)

OTHER PUBLICATIONS

IPDL JPO machine translation of JP2003045453, published on Feb. 14, 2003, retrieved on Aug. 4, 2009.*

*Primary Examiner*—Dah-Wei D Yuan
*Assistant Examiner*—Katherine Turner
(74) *Attorney, Agent, or Firm*—H.C. Park & Associates, PLC

(57) ABSTRACT

A direct liquid feed fuel cell includes a membrane electrode assembly including a plurality of unit cells composed of an electrolyte membrane, and a plurality of anodes and cathodes formed on opposing surfaces of the electrolyte membrane; a current collection plate including a plurality of first current collecting portions correspondingly coupled with the anodes; a diffusion plate receiving a liquid fuel supplied from an inlet formed at a side thereof; a liquid fuel tank supplying the liquid fuel to the diffusion plate through the inlet; a plurality of second current collecting portions correspondingly coupled with the cathodes; a porous plate, arranged on the second current collecting portions, and communicating with air; and a conductive portion coupling the first and second current collecting portions to form an electrical circuit of the unit cells.

9 Claims, 6 Drawing Sheets

FOREIGN PATENT DOCUMENTS

| | | | |
|---|---|---|---|
| JP | 2003045453 | * | 2/2003 |
| JP | 2003-086207 | | 3/2003 |
| JP | 2003-317745 | | 11/2003 |
| JP | 2003-317791 | | 11/2003 |
| JP | 2004-055307 | | 2/2004 |
| JP | 2004-103262 | | 4/2004 |
| KR | 10-2003-0014895 | | 2/2003 |
| KR | 10-2003-0075755 | | 9/2003 |
| KR | 10-2004-0030258 | | 4/2004 |
| WO | 2004-051781 | | 6/2004 |

* cited by examiner

DIRECT LIQUID FEED FUEL CELL AND PORTABLE ELECTRONIC APPARATUS INCLUDING THE SAME

CROSS-REFERENCE TO RELATED PATENT APPLICATIONS

This application claims priority to and the benefit of Korean Patent Application No. 10-2004-0117963, filed on Dec. 31, 2004, which is hereby incorporated by reference for all purposes as if fully set forth herein.

BACKGROUND OF THE INVENTION

1. Field of the Invention

The present invention relates to a direct liquid feed fuel cell for charging a rechargeable battery.

2. Discussion of the Background

Generally, direct liquid feed fuel cells generate electricity by an electrochemical reaction of an organic compound fuel, such as methanol or ethanol, and an oxidant, i.e. oxygen, and they have very high energy and power density. Since direct liquid feed fuel cells directly use a liquid fuel such as methanol, peripheral devices, such as a fuel reformer, are not required and fuel storage and supply are easy.

As FIG. 1 shows, a direct liquid feed fuel cell may include an electrolyte membrane 1 arranged between an anode 2 and a cathode 3. The anode 2 and the cathode 3 include fuel diffusion layers 22 and 32 for fuel supply and diffusion, catalyst layers 21 and 31 for the redox reaction of fuel, and electrode support layers 23 and 33, respectively. A catalyst for electrode reaction may be a noble metal catalyst, such as platinum, which has good catalytic characteristics even at low temperature. A transition metal-alloy catalyst derived from ruthenium, rhodium, osmium, nickel, etc., may be used to prevent catalyst poisoning by reaction byproducts (i.e. carbon monoxide). The electrode support layers 23 and 33 may be carbon paper, carbon cloth, etc., and they may be waterproofed to facilitate the fuel supply and the reaction product discharge. The electrolyte membrane 1 may be a 50-200 μm thick polymer membrane. A proton exchange membrane containing moisture and having ionic conductivity may be used as the electrolyte membrane 1.

Among direct liquid feed fuel cells, direct methanol fuel cells (DMFCs) using a mixed fuel of methanol and water involve two electrode reactions: fuel oxidation (anode reaction) and oxygen reduction in the presence of protons (cathode reaction). These reactions may be summarized as follows:

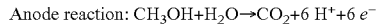
Anode reaction: $CH_3OH + H_2O \rightarrow CO_2 + 6\ H^+ + 6\ e^-$

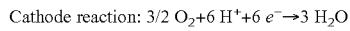
Cathode reaction: $3/2\ O_2 + 6\ H^+ + 6\ e^- \rightarrow 3\ H_2O$

Overall reaction: $CH_3OH + 3/2\ O_2 \rightarrow 2\ H_2O + CO_2$

At the anode 2, where fuel oxidation occurs, methanol reacts with water to produce carbon dioxide, protons, and electrons. The generated protons travel to the cathode 3 through the electrolyte membrane 1. At the cathode 3, where oxygen reduction occurs, protons, electrons, which are supplied from an external circuit, and oxygen react to produce water. Hence, in the overall reaction of DMFCs, water and carbon dioxide are produced through methanol and oxygen reaction. Here, reaction of 1 mole of methanol with oxygen produces 2 moles of water.

U.S. Pat. No. 6,326,097 discloses a fuel cell for charging a cellular phone battery. The fuel cell is useful in charging portable electronic device batteries.

SUMMARY OF THE INVENTION

The present invention provides a direct liquid feed fuel cell for charging a battery of a portable electronic apparatus.

The present invention also provides a portable electronic apparatus including the direct liquid feed fuel cell.

Additional features of the invention will be set forth in the description which follows, and in part will be apparent from the description, or may be learned by practice of the invention.

The present invention discloses a direct liquid feed fuel cell including a membrane electrode assembly (MEA) including a plurality of unit cells composed of an electrolyte membrane, a plurality of anodes arranged on a first surface of the electrolyte membrane, and a plurality of cathodes formed on a second surface of the electrolyte membrane and at locations corresponding to the anodes. A current collection plate includes a plurality of first current collecting portions correspondingly coupled with the anodes of the MEA, and a diffusion plate receives a liquid fuel supplied through an inlet arranged at a side thereof, the current collection plate being arranged on the diffusion plate. A liquid fuel tank is coupled with the inlet and supplies the liquid fuel to the diffusion plate. A plurality of second current collecting portions are correspondingly coupled with the cathodes, and a porous plate, which is arranged on the second current collecting portions, communicates with air. A conductive portion couples the first current collecting portions and the second current collecting portions to form an electrical circuit of the unit cells.

The present invention also discloses a portable electronic apparatus including a portable electronic device, a rear cover attached with a rear surface of the portable electronic device, and a front cover to cover a front surface of the portable electronic device. The front cover includes a direct liquid feed fuel cell. A liquid fuel tank supplies a liquid fuel to the fuel cell, and a rechargeable battery is electrically coupled with the fuel cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
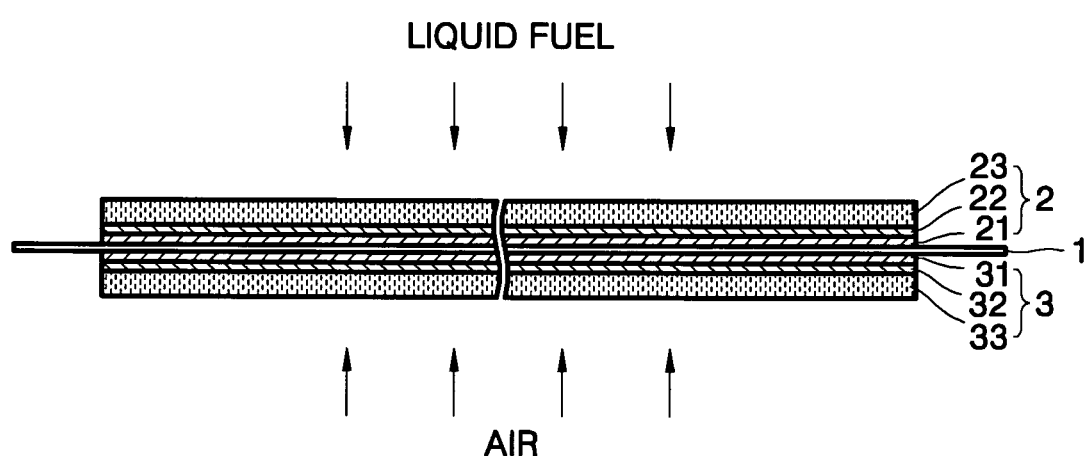
FIG. 1 is a sectional view showing a fundamental structure of a direct liquid feed fuel cell.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
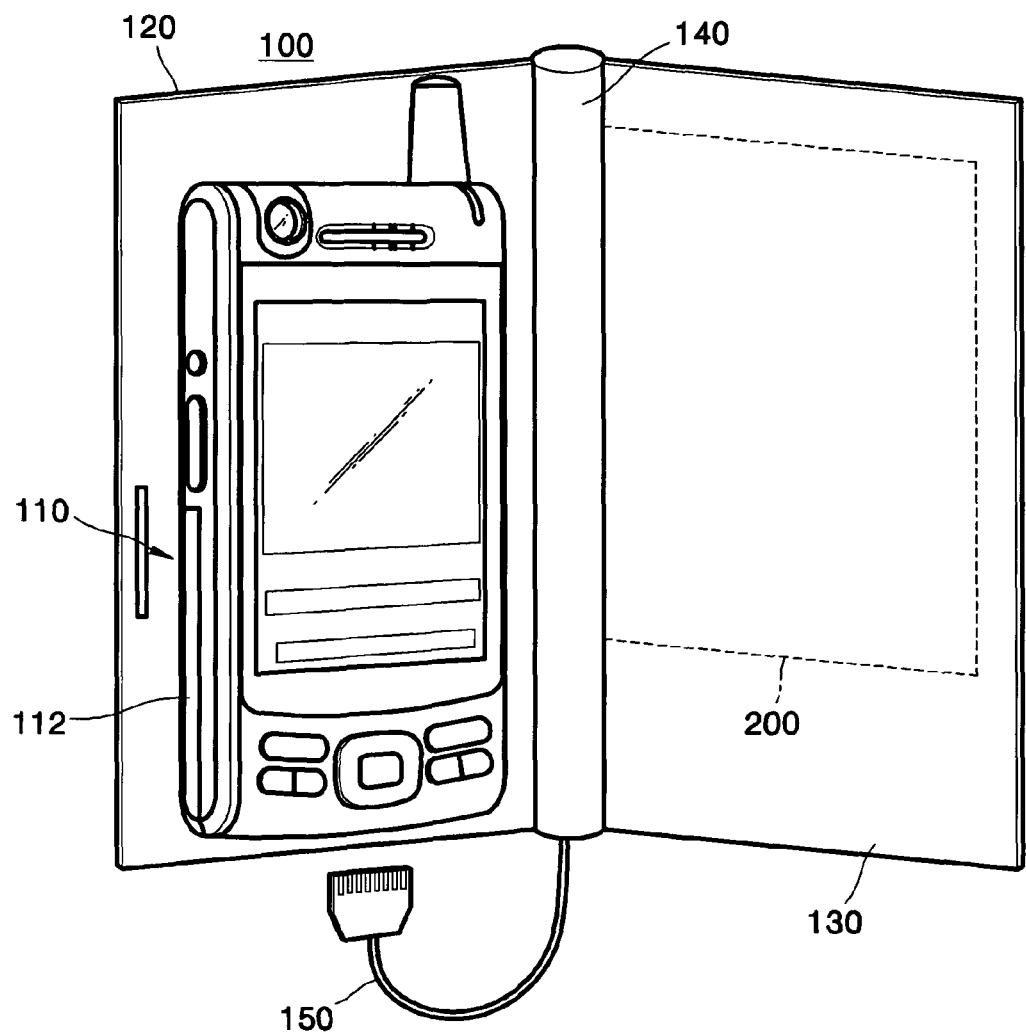
FIG. 2 is a schematic perspective view showing a portable electronic apparatus including a direct liquid feed fuel cell according to an embodiment of the present invention.

FIG. 2 is a schematic perspective view showing a portable electronic apparatus including a direct liquid feed fuel cell according to an embodiment of the present invention.

Referring to FIG. 2, a portable electronic apparatus 100 includes a portable electronic device 110 and a direct liquid feed fuel cell 200 to charge a rechargeable battery 112 of the portable electronic device 110. Examples of the portable electronic device 110 include a PDA phone, a smart phone or a cellular phone. A rear side of the portable electronic device 110 is detachably installed at a rear cover 120, and a front cover 130 may cover a front surface of the portable electronic device 110. The direct liquid feed fuel cell 200, which is a characteristic part of the present invention, is contained in the front cover 130. A liquid fuel tank 140 is arranged between the front cover 130 and the rear cover 120. The liquid fuel tank 140 stores liquid fuel, such as, for example methanol. The liquid fuel tank 140 may be fixed to the front cover 130. Alternatively, the liquid fuel tank 140 may be a liquid fuel cartridge that may be detached from the front cover 130. The fuel cell 200 and the liquid fuel tank 140 may be coupled together in a docking structure.

The rechargeable battery 112 is mounted at a rear surface of the portable electronic device 110. A lower part of the portable electronic device 110 is formed with a terminal for charging (not shown) that is electrically coupled with a charging connector 150, which is electrically coupled with the fuel cell 200, to charge the rechargeable battery 112.

Figure 3:
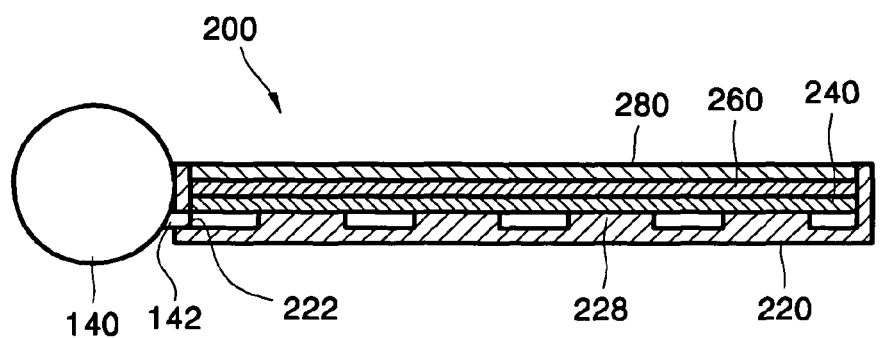
FIG. 3 is a schematic sectional view showing the direct liquid feed fuel cell of FIG. 2 including a liquid fuel tank.
Figure 4:
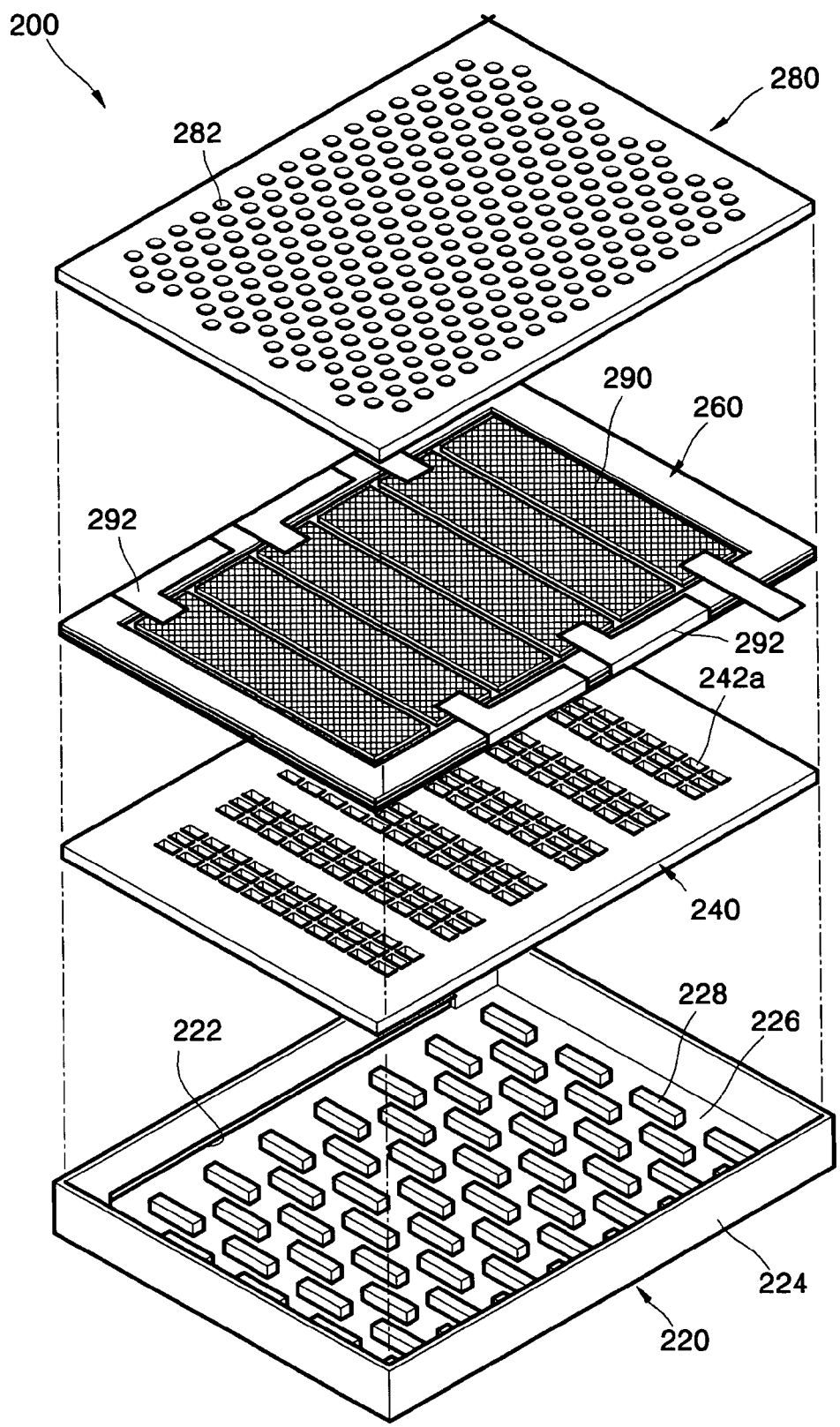
FIG. 4 is an exploded perspective view of the direct liquid feed fuel cell of FIG. 3.

FIG. 3 is a schematic sectional view showing the direct liquid feed fuel cell 200 of FIG. 2 equipped with the liquid fuel tank 140, and FIG. 4 is an exploded perspective view of the fuel cell 200 of FIG. 3. The liquid fuel tank 140 is omitted in FIG. 4 for convenience of illustration. Substantially the same constitutional elements as in FIG. 2 are represented by the same reference numerals and a detailed description thereof is omitted.

Referring to FIG. 3 and FIG. 4, the liquid fuel tank 140 is coupled with a side of the fuel cell 200. A portion of the fuel cell 200 coupled with the liquid fuel tank 140 is a slit 222 for an inlet of the liquid fuel. The fuel tank 140 is formed with a projecting slit 142, which may be docked to the slit 222 so that liquid fuel, for example, a 1:1 (molar ratio) mixture of methanol and water, may be supplied to the fuel cell 200 from the fuel tank 140. The docking structure may be diversely modified.

The fuel cell 200 has a sequentially stacked structure of a diffusion plate 220, a current collection plate 240, a membrane electrode assembly (MEA) 260, and a porous plate 280.

The diffusion plate 220 may be hydrophilically treated to ensure sufficient diffusion of liquid fuel. An end of the diffusion plate 220 coupled with the fuel tank 140 includes the slit 222. A rectangular frame 224 of the diffusion plate 220 may be formed high enough to cover sides of the diffusion plate 220, the current collection plate 240, the MEA 260, and the porous plate 280. For example, the rectangular frame 224 may be 3 to 6 mm high. Projections 228 may be formed to a height of about 100 to 200 μm from the bottom 226 of the diffusion plate 220.

Figure 5:
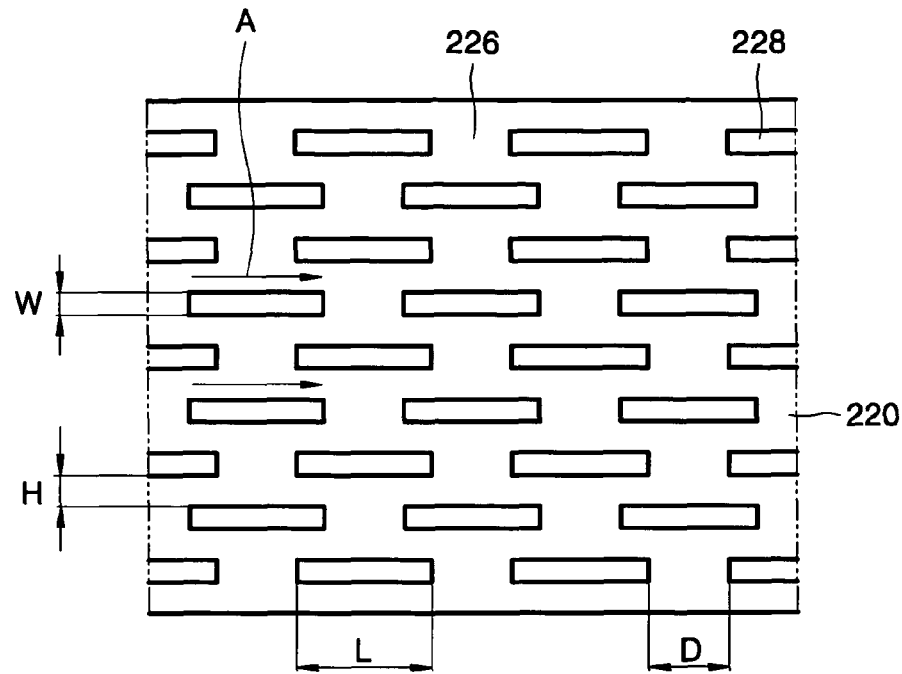
FIG. 5 is a partial plan view of a diffusion plate in the direct liquid feed fuel cell of FIG. 3 and FIG. 4.

FIG. 5 is a partial plan view of the diffusion plate 220 of FIG. 3 and FIG. 4. Referring to FIG. 3, FIG. 4 and FIG. 5, the projections 228 are formed vertically from the bottom 226. The projections 228 may be formed in the same or different shapes. Further, the projections 228 are formed in a substantially linear pattern having a predetermined length L and a horizontal gap D between two horizontally adjacent projections, (i.e. between two adjacent projections in the direction of arrow A, which is substantially perpendicular with respect to the lengthwise direction of the slit 222), and a predetermined width W and a vertical gap H, which are shorter than the length L. Here, the patterns are alternately arranged. The projections 228 may be formed with the same or different heights. Liquid fuel passed through the slit 222 is diffused by the projections 228.

Figure 6:
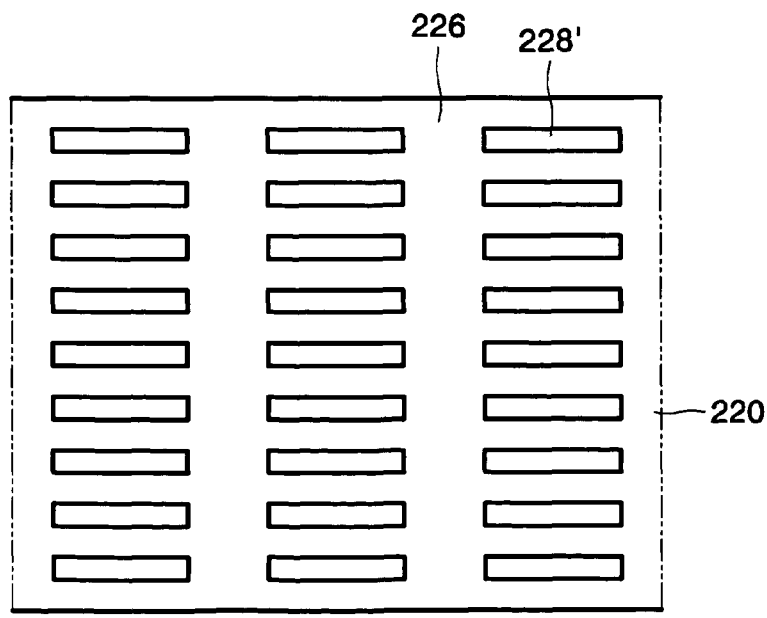
FIG. 6 is a partial plan view of a modified example of the diffusion plate of FIG. 5.

FIG. 6 is a partial plan view of a modified example of the diffusion plate 220 of FIG. 5. Referring to FIG. 6, projections 228' have substantially the same dimensions as the alternately arranged projections 228 of FIG. 5, but they are arranged in a matrix-type structure.

Figure 7:
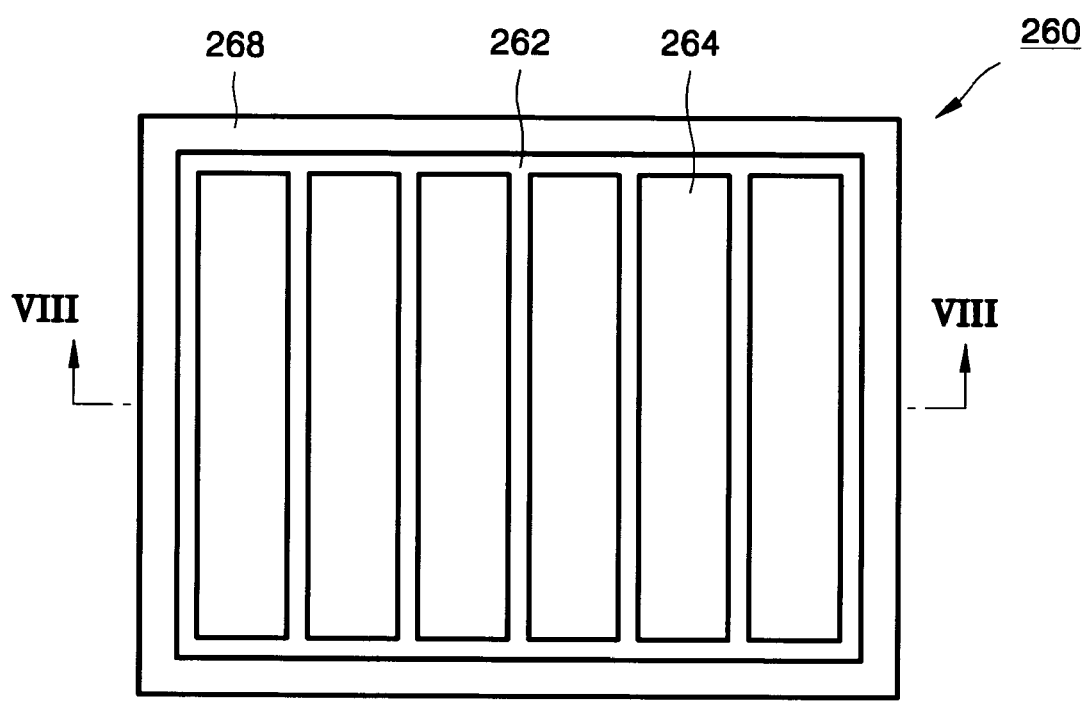
FIG. 7 is a plan view showing an anode of a membrane electrode assembly in the direct liquid feed fuel cell of FIG. 3 and FIG. 4.
Figure 8:
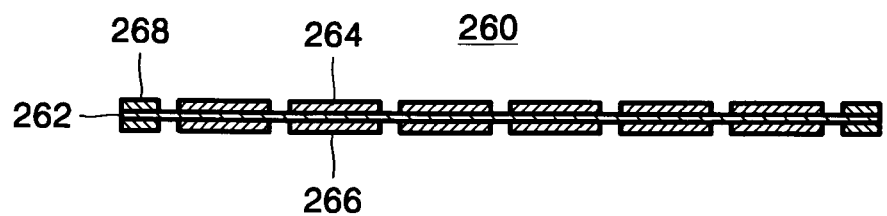
FIG. 8 is a sectional view taken along line VIII-VIII of FIG. 7.

FIG. 7 is a plan view showing an anode 264 of the MEA 260 of FIG. 3 and FIG. 4, and FIG. 8 is a sectional view taken along line VIII-VIII of FIG. 7. Referring to FIG. 7 and FIG. 8, a rectangular gasket 268 is attached along an edge of an electrolyte membrane 262. The gasket 268 may be made of silicon-coated TEFLON with good elasticity. The gasket 268 is omitted in FIG. 1 for convenience of illustration. The gasket 268 is arranged along an edge of the MEA 260 to prevent leakage of methanol supplied to the anode 264 from a liquid fuel tank (see 140 of FIG. 2). The gasket 268 has a sealing effect when the constitutional elements of the fuel cell 200 are assembled.

Six pairs of anodes 264 and cathodes 266 are symmetrically attached to the electrolyte membrane 262. That is, six anodes 264 are separately arranged on a surface of the electrolyte membrane 262, and six cathodes 266 are separately arranged on the other surface of the electrolyte membrane 262, thereby forming six unit cells on the electrolyte membrane 262. The anodes 264 may be spaced apart from each other by, for example, 1 mm. Similarly, the cathodes 266 may be spaced apart from each other by, for example, 1 mm.

Figure 9:
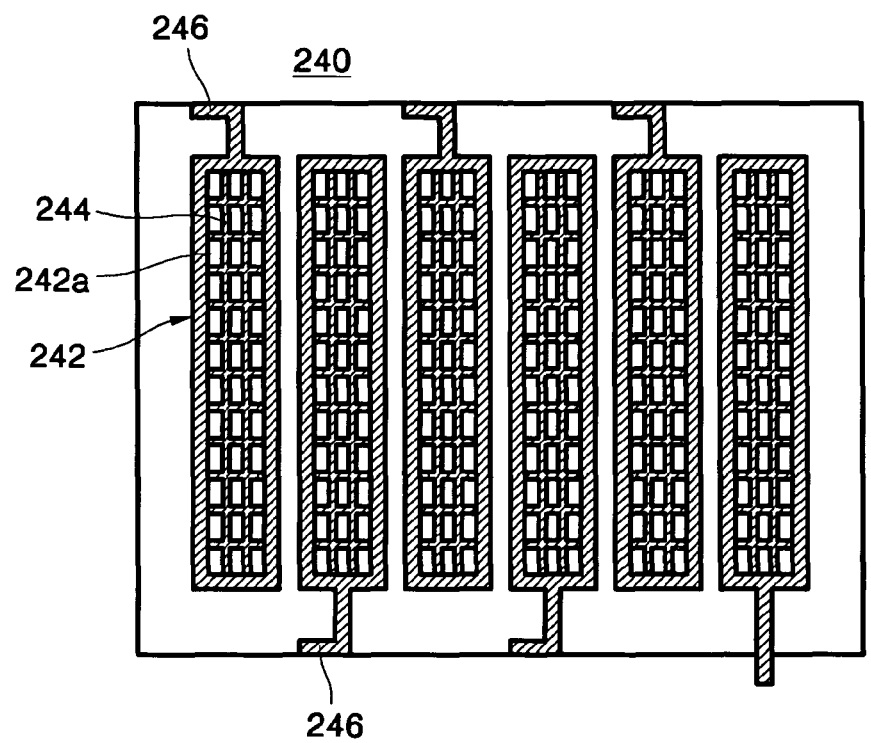
FIG. 9 is a plan view of a bottom surface of a current collection plate in the direct liquid feed fuel cell of FIG. 3 and FIG. 4.

FIG. 9 is a plan view of a bottom surface of the current collection plate 240 of FIG. 3 and FIG. 4 contacting with the anode. Referring to FIG. 4 and FIG. 9, current collecting portions 242 are arranged in regions of the current collection plate 240 corresponding to the unit cells of the MEA 260. In each current collecting portion 242, a plurality of holes 242a are defined by bars 244 occupying a predetermined area. The current collection plate 240 may be made of an insulating material. The current collecting portions 242, and conductive portions 246, which are coupled with other current collecting portions (see 290 of FIG. 10) on the cathode 266, are coated with a conductive metal, for example gold. The current collecting portions 242 are electrically insulated from each other. The diffusion plate 220 supplies liquid fuel to the anode 264 through the holes 242a formed in the current collecting portions 242. Fuel to be used in the anode 264 is supplied from the diffusion plate 220 and the liquid fuel tank 140 by a capillary force generated between the current collection plate 240 and the diffusion plate 220.

Referring to FIG. 4, the porous plate 280 may be formed with a plurality of air vents 282 communicating with air, or it may be made of a porous material. The porous plate 280 discharges $CO_2$ or water emitted from the cathode 266.

Current collecting portions may be arranged between the porous plate 280 and the cathode 266. Here, the current collecting portions may be the same as the current collecting portions 242 of the current collection plate 240 of FIG. 9, or they may be the mesh-shaped current collecting portions 290 of FIG. 10.

Figure 10:
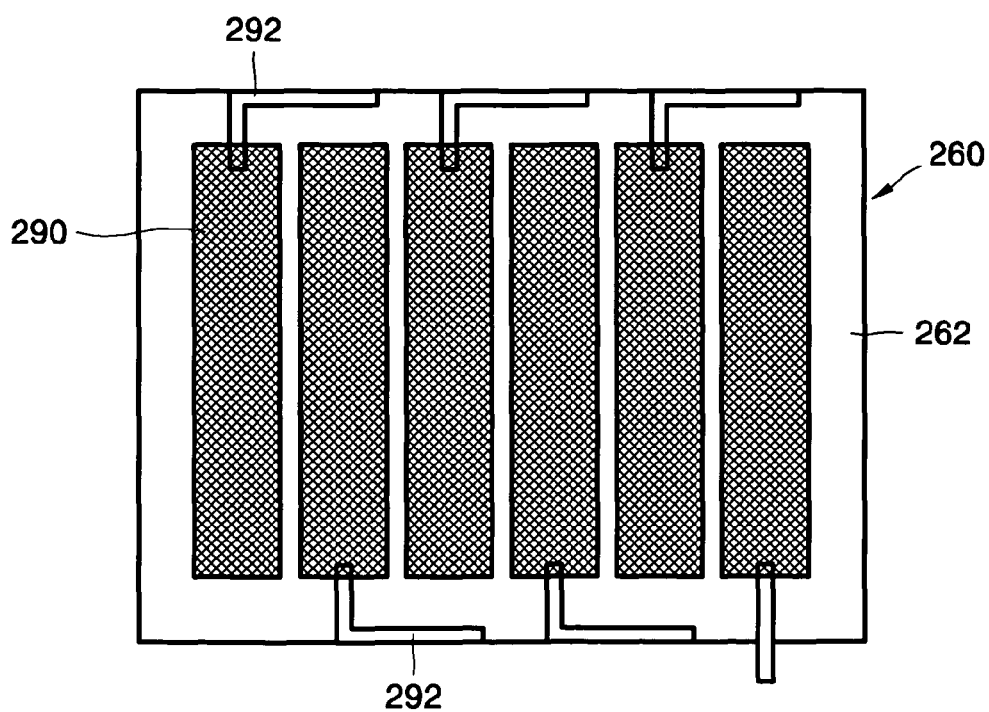
FIG. 10 is a plan view of a surface of a membrane electrode assembly in the direct liquid feed fuel cell of FIG. 3 and FIG. 4.

Referring to FIG. 10, the mesh-shaped current collecting portions 290 are formed on the cathode 266, which is formed on an electrolyte membrane 262 of a MEA 260. An end of each current collecting portion 290 is electrically coupled with a conductive portion 292. The conductive portion 292 is an electrical circuit that serially electrically couples the six anodes 264 and six cathodes 266 constituting the six unit cells. This is well known technology, and thus a detailed description thereof is omitted.

A fuel cell according to embodiments of the present invention may be directly connected to a portable electronic device to charge the device's battery or to be used as a substitute for the battery. The fuel cell is thin and lightweight. In the fuel cell, fuel is horizontally supplied to a diffusion plate from a fuel tank and then vertically supplied to an anode via a current collection plate arranged on the diffusion plate.

As apparent from the above description, a direct liquid feed fuel cell according to embodiments of the present invention may easily charge a rechargeable battery of a portable electronic device, thus increasing the device's service time. Furthermore, a diffusion plate including a projection pattern assists in liquid fuel diffusion. A current collection plate serves to collect current, and at the same time, to facilitate the flow of liquid fuel and continuous supply of the liquid fuel to an anode by the capillary force generated between the current collection plate and the diffusion plate.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A direct liquid feed fuel cell, comprising:
    a membrane electrode assembly (MEA) comprising a plurality of unit cells composed of an electrolyte membrane, a plurality of anodes arranged on a first surface of the electrolyte membrane, and a plurality of cathodes arranged on a second surface of the electrolyte membrane and at locations corresponding to the anodes;
    a current collection plate comprising a plurality of first current collecting portions correspondingly coupled with the anodes;
    a diffusion plate receiving a liquid fuel supplied through an inlet arranged at a side thereof, the current collection plate being arranged on the diffusion plate;
    a liquid fuel tank coupled with the inlet and supplying the liquid fuel to the diffusion plate;
    a plurality of second current collecting portions correspondingly coupled with the cathodes;
    a porous plate, arranged on the second current collecting portions, and communicating with air; and
    a conductive portion coupling the first current collecting portions and the second current collecting portions to form an electrical circuit of the unit cells,
    wherein the diffusion plate comprises a frame projected from an edge of a bottom thereof, and
    wherein the frame covers sides of the current collection plate, the MEA, and the porous plate.

2. The direct liquid feed fuel cell of claim 1, wherein the inlet comprises a slit arranged in a lengthwise direction of the side of the diffusion plate.

3. The direct liquid feed fuel cell of claim 2, wherein the diffusion plate further comprises projections lengthwisely arrayed perpendicularly with respect to the lengthwise direction of the slit and separated from each other.

4. The direct liquid feed fuel cell of claim 3, wherein the frame extends higher than the projections.

5. The direct liquid feed fuel cell of claim 3, wherein the projections are alternately arranged.

6. The direct liquid feed fuel cell of claim 3, wherein the projections are arranged in a matrix-type structure.

7. The direct liquid feed fuel cell of claim 1, wherein each of the first current collecting portions comprises a plurality of holes.

8. The direct liquid feed fuel cell of claim 7, wherein the first current collecting portions are electrically insulated from each other, and each first current collecting portion is electrically coupled with the conductive portion.

9. The direct liquid feed fuel cell of claim 1, wherein the liquid fuel tank is detachably coupled with the inlet.

* * * * *